US008171395B2

(12) United States Patent
Kostoulas et al.

(10) Patent No.: US 8,171,395 B2
(45) Date of Patent: May 1, 2012

(54) DATA REPORTING APPLICATION PROGRAMMING INTERFACES IN AN XML PARSER GENERATOR FOR XML VALIDATION AND DESERIALIZATION

(75) Inventors: Margaret Gaitatzes Kostoulas, Belmont, MA (US); Moshe E. Matsa, Cambridge, MA (US); Martha A. Mercaldi, Concord, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 12/130,208

(22) Filed: May 30, 2008

(65) Prior Publication Data

US 2008/0229293 A1 Sep. 18, 2008

Related U.S. Application Data

(63) Continuation of application No. 11/465,818, filed on Aug. 21, 2006, now abandoned.

(51) Int. Cl.
*G06F 3/00* (2006.01)
*G06F 9/45* (2006.01)

(52) U.S. Cl. ........ 715/234; 715/205; 715/237; 715/762; 717/115; 717/143

(58) Field of Classification Search .......... 715/200–203, 715/205, 209, 226, 234, 238, 256, 273, 274, 715/700, 731, 760, 762; 717/100, 101, 109, 717/110, 111, 113, 114, 115, 143
See application file for complete search history.

(56) References Cited

U.S. PATENT DOCUMENTS

| 7,207,002 | B2 * | 4/2007 | Mireku ........................ 715/234 |
| 2001/0054172 | A1 * | 12/2001 | Tuatini ............................. 717/1 |
| 2003/0159112 | A1 * | 8/2003 | Fry ............................... 715/513 |
| 2003/0182364 | A1 | 9/2003 | Large et al. |
| 2004/0167937 | A1 * | 8/2004 | Sirois et al. ................... 707/203 |
| 2005/0097455 | A1 * | 5/2005 | Zhou et al. .................... 715/513 |
| 2005/0097504 | A1 * | 5/2005 | Ballinger et al. ............. 717/100 |
| 2005/0108627 | A1 * | 5/2005 | Mireku ........................ 715/513 |
| 2007/0050704 | A1 * | 3/2007 | Liu ............................... 715/513 |

OTHER PUBLICATIONS

"Generation of efficient parsera through direct comilation of XML Schema grammars" Perkins, E.; Matsa, M; Kostoulas, M. G.; Heifets, A.; and Mendelsohn, N. IBM Systems Journal, vol. 45, No. 2, 2006. 20 pages.

* cited by examiner

*Primary Examiner* — Maikhanh Nguyen
(74) *Attorney, Agent, or Firm* — Cantor Colburn LLP; Derek Jennings

(57) ABSTRACT

A method for interfacing with an XML (Extensible Markup Language) parser generator to generate deserialization information interleaved with XML parsing and validation, including: providing an XML parser generator with information about the schema which the instance data conforms to; providing a data reporting application programming interface (API) and a generator module; providing one or more implementations of the data reporting API; providing the XML parser generator with a selected data reporting API implementation module; generating an XML parser to parse and validate instance documents conforming to the specified input schema and deserializing the instance documents into the desired deserialization format during the parse.

7 Claims, 2 Drawing Sheets

DATA REPORTING APPLICATION PROGRAMMING INTERFACES IN AN XML PARSER GENERATOR FOR XML VALIDATION AND DESERIALIZATION

CROSS-REFERENCE TO RELATED APPLICATION

This application is a continuation of U.S. patent application Ser. No. 11/465,818, filed Aug. 21, 2006. The disclosure of the above application is incorporated herein by reference.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to the field of data reporting when parsing XML documents, and more particularly to how to directly deserialize the data in an application-specific format, without costly intermediate processing and representations.

2. Description of Background

Extensible Markup Language, or XML, parsers are deployed in varying applications, each requiring different application interfaces to report the data with. Sometimes this is achieved by writing an entire application specific parser or by writing the parser against a sufficiently general and low level Application Programming Interface, or API, and supplying transducers for application-specific data structures. Other times, parsers are written to support several APIs, or are written as a collection of multiple generalized components only some of which are used each time. For example, Xerces, an open source XML parser, supports several versions of the Simple API for XML, or SAX, and the Document Object Model API, or DOM, as well as Xerces Native Interface, or XNI, making it slower. Other XML parsers have been written as a collection of generalized components, which the end user has to assemble by hand. In all these cases, adding a new API requires a lot of new code that is low-level, high-complexity, hard-to-debug, and hard-to-maintain. The user ends up modifying the validation code to add support for a new data reporting API.

Therefore, a method for generating the appropriate API code relevant to the particular usage of an XML parser would be highly desirable.

SUMMARY OF THE INVENTION

Exemplary embodiments include a method for interfacing with an XML (Extensible Markup Language) parser generator to generate deserialization information interleaved with XML parsing and validation, including: configuring a parser generator with information about the schema which the instance data conforms to, in order to generate an XML parser that parses and validates the instance data efficiently; providing a data reporting application programming interface (API) and a generator module; providing one or more implementations of the data reporting API; providing the XML parser generator with a data reporting API implementation module; generating an XML parser to parse and validate instance documents conforming to the specified input schema and deserializing the instance documents into the desired deserialization format during the parse.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides a means of interfacing with a standalone data reporting API generator module that is interfaced with by the parser generator, to designate the desired deserialization code into the generated parsing and validation code.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
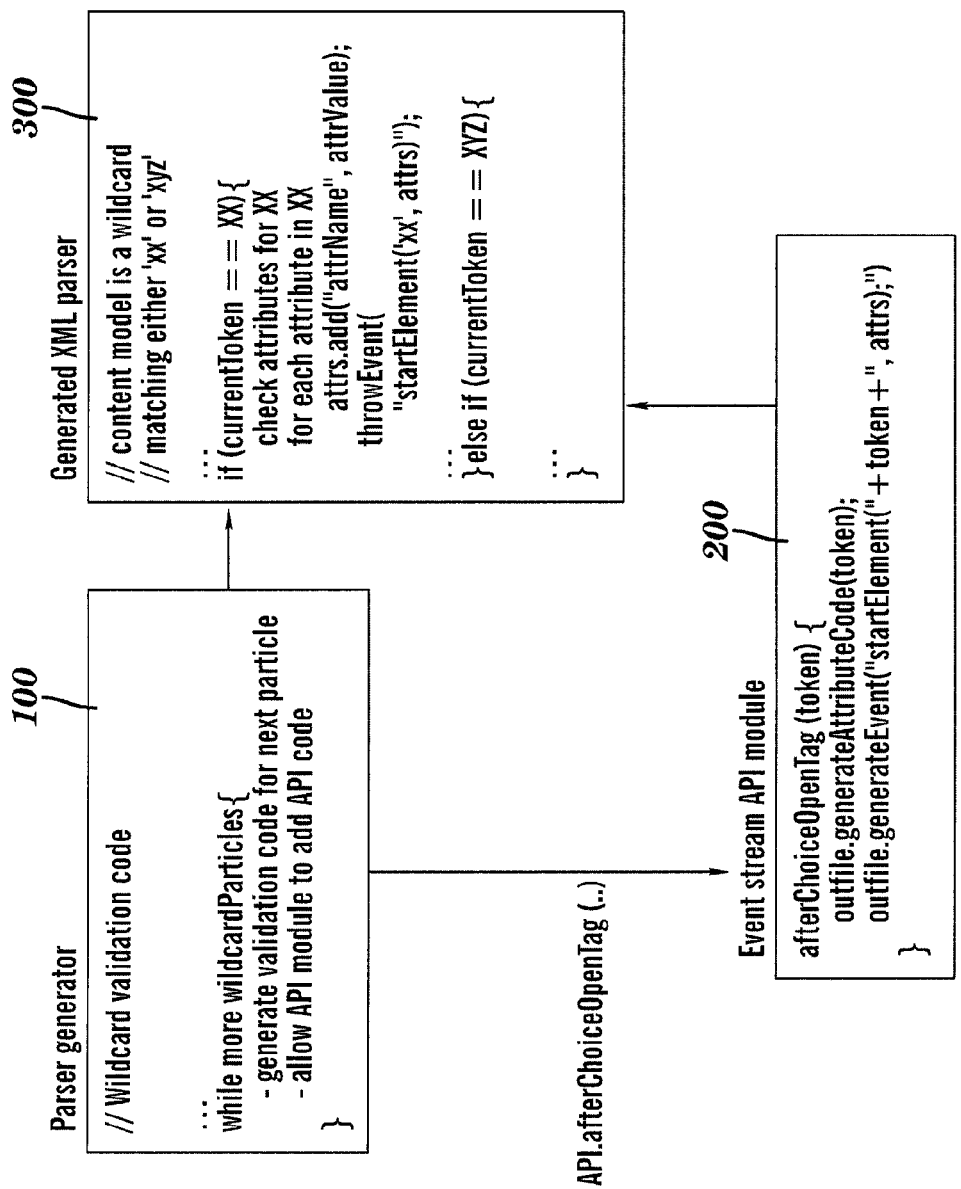
FIG. 1 illustrates the interaction between the parser generator and an event stream data reporting API generator module that uses SAX events to notify the application of the instance document data, and shows the code generated in the resulting parser, in accordance with exemplary embodiments.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn in all detail possible. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

In exemplary embodiments, a data reporting API module may be implemented as an independent piece of the parser generator. The data reporting API module is invoked during code generation, and given context information of where the parser is at the time of invocation. At that point, the data reporting API module determines what code needs to be generated into the runtime instruction stream. The XML Parser generated in this way contains the exact code needed to generate the targeted event stream, business object, or other structure, resulting in very efficient notifications or deserialization into objects, during the parsing phase.

Figure 2:
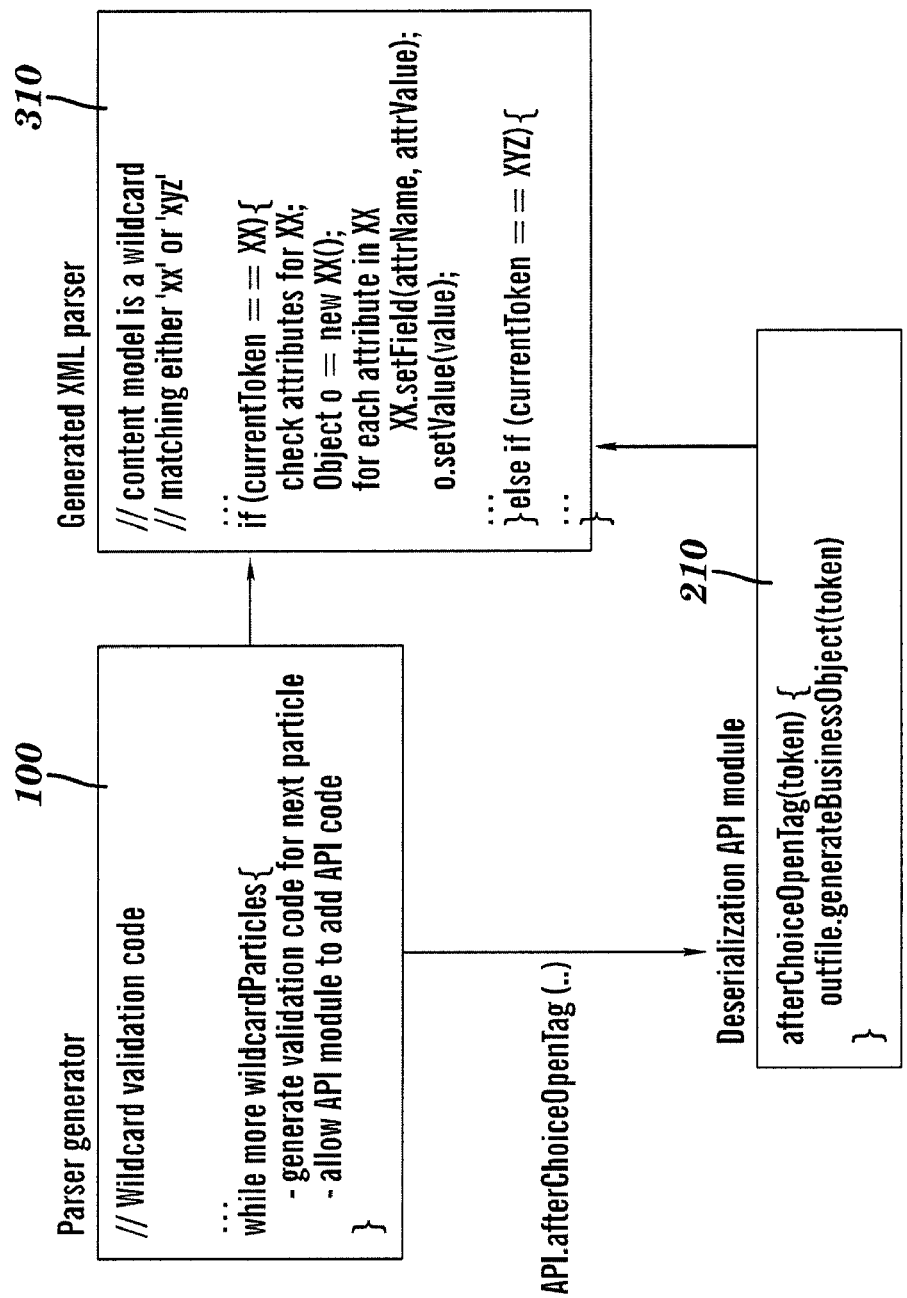
FIG. 2 illustrates the interaction between the parser generator and a business object data reporting API generator module for the case when deserialization into application specific objects is needed by the application, in accordance with exemplary embodiments.

Different implementations of the data reporting API object are loaded during the code generation phase, based on information provided by the user regarding the desired deserialization format of the XML instance data. FIG. 1 shows an example of an event stream API generator object that uses SAX events to notify the application of the instance document data. FIG. 2 shows sample API Generator code as well as the corresponding generated code for the case where deserialization into application specific objects is needed by the application. The specific deserialization API shown in the figure is Java API for XML-Based Remote Procedure Call, or JAX-RPC.

In one embodiment, application specific operations are inserted directly into the generated executable code, in a context sensitive way. This is achieved by associating actions with their context, in a way that disengages them from the operational details of parsing and validation. Arbitrary code can be inserted for specific contextual aspects, through the use of a generalized data reporting API generator module, which removes indirection layers at runtime and allows for optimal performance. The compile-time separation of application-specific code into separate modules results in parser generator code that is simpler and easier to maintain. For example, adding or removing support for a different data reporting interface would no longer require any modification of the parsing or validation code.

In one embodiment, custom parsers and validators of XML instance documents are utilized. The customization comes from the a priori knowledge of the schema the data must conform to, as well as information about how the target application will use the instance document data. The latter customization is used by the data reporting generator module, which is configured at startup with information about the target application's runtime environment.

New data reporting generator modules may be developed as needed by the application author, with no knowledge of the parsing and validator code, while still retaining efficient reporting of the data. The user simply needs to provide an implementation of the DataReportingGenerator interface. The parser generator will invoke methods in this implementation during code generation to add user-defined code into the generated parser, which will report the instance data in the form desirable by the application. The application can choose to ignore parts of the input data, and this is easily implemented in this model by providing no actions for certain contexts. This enables applications to easily avoid the cost of deserializing pieces of data of no interest to them, making the whole processing of the input data even more efficient.

The data reporting module can be used to generate code that creates appropriate data structures to store the instance data, assign values to such structures, and allocate space when needed. It can also provide an expression for accessing the instance document data, and this information can be used by the parser generator when generating code that needs to access this data, without a-priori knowledge of how the data is being stored. The interface between the data reporting API Generator module and the parser generator includes passing around two types of information:

Information is passed from the parser generator to the data reporting generator module describing the current context that the parser generator is currently generating code for: for example, the type of the data that the parser generator is currently handling, such as the particular schema component. Additional information, such as the particle wrapping the current schema component as well as references to components that may appear in place of the one currently handled may also be provided to the data reporting generator module.

In the other direction, the data reporting generator module provides information to the parser generator regarding how instance data may be referenced during runtime and thus how the parser generator can refer to this same data for its parsing and validation requirements.

In exemplary embodiments, a standalone data reporting generator module is interfaced with the parser generator, to designate the desired deserialization code to be executed while parsing the instance document. Different implementations of the data reporting generator module can be plugged in at parser generation time (compile time), to generate the desired deserialization code. It should be noted that there is a compilation phase, during which an XML parser is generated. The parser is used at runtime to parse an instance document, or XML data stream, and deserialize the data found in the instance document. As used herein, deserializing the data means converting the data into a form that can be used by the user application (i.e., data structures, events, etc). Typically, the XML parser would generate generic data structures, possibly conforming to some industry standard form; the user application needs to convert this intermediate form to the application specific data description. With the suggested approach, this two-step runtime conversion is eliminated completely: the custom XML parser generated during the compilation phase generates at runtime the data structures needed by the end application.

For example, given the input document

```
<address>
    <street>Belmont Rd</street>
    <number>20</number>
    <city>Bethesda</city>
    <zip>04792</zip>
</address>
``` the data may be converted to a Java object, similar to
   new Address ("Belmont Rd", 20, "Bethesda", "04792")
or a SAX event stream, similar to:

```
startElement ("address");
startElement("street");
characterData("Belmont Rd");
endElement( );
startElement("number");
characterData("20");
endElement( );
startElement("city");
characterData("Bethesda");
endElement( );
startElement("zip");
characterData("04792");
endElement( );
endElement( );   // </address>
```

Notice how in one case, when the SAX event stream deserialization is used, the "number" field is reported as the String value "20". When the business object deserialization is used, the "number" field is reported as the integer value 20. During the parser generation phase, code is inserted from the data reporting generator module into the generated parser to perform the conversion appropriate for the desired deserialization, if any is needed. The parser generator is not aware of such conversions itself, it is up to the specific implementation of the data reporting generator module to determine what conversions might need to occur to convert the instance data into the specific deserialization format.

FIGS. 1 and 2 illustrate the interaction of the parser generator 100 with the data reporting generator module 200 and 210, during compile time, and sample output code that is generated during this interaction 300 and 310. In the specific example, the parser generator is generating validation code for a wildcard. From the input schema that the XML instance data conforms to, we know that the specific wildcard matches either "xx" or "xyz" elements.

For illustrative purposes, the parser generator generates a comment into the output stream. Next, the parser generator proceeds to generate validation code for each of the wildcard particles. The first wildcard particle matches "xx", so the following code is generated:

```
if(currentToken == XX) {
    check attributes for XX;
```

At this point the parser generator invokes the data reporting generator module that has been instantiated for this compilation scenario, with a call to <data-reporting-module>.afterChoiceOpenTag(..)

The data-reporting module can generate the appropriate code for the matched particle. In the case of the event stream data-reporting module (FIG. 1), this results in:

```
// build up attribute list
Attributes attr_list = new AttributesImpl( );
for each attribute that can appear in XX
    attr_list.add("attrName", attrValue)
throwEvent("startElement('"', "xx", "xx", attr_list)");
```

In FIG. 2, where the desired deserialization is a JaxRPC-style business object, the code generated must create a business object of the appropriate type (in this case an XX object) and initialize it with the data in the instance document. The generated code looks like:

```
Object o = new XX( );
for each attribute in XX
    o.setField("attrName", attrValue)
o.setValue(value);
```

This process is repeated for all other particles of the wildcard, in this case the particle for XYZ.

Note that the attribute handling code will not appear in the generated parser if there were no attributes in the schema type for this element, as this information is known at compile time. Furthermore, the attrName will be hardcoded into the generated parser at compile time, since it is known at that time, while the attrValue will be generated as a variable which points to the value in the parser validation code.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for interfacing with an XML (Extensible Markup Language) parser generator to generate deserialization information interleaved with XML parsing and validation, the method comprising:
    providing an XML parser generator with information about a specified input schema which the instance data conforms to;
    providing a data reporting application programming interface (API) module; performing by a computer:
    generating, by the XML parser generator, an XML parser to parse and validate instance documents conforming to the specified input schema;
    inserting, by the XML data reporting API module, user-defined code into the XML parser during the generating; and
    deserializing the instance documents into the desired deserialization form during the parse using the user-defined code,
    wherein two types of information is exchanged between the data reporting API and the XML parser generator,
    wherein a first type of information describes a current context that the XML parser generator is currently generating code for, and
    wherein a second type of information involves how the instance data is referenced during runtime and how the XML parser generator refers to the referenced instance data for parsing and validation requirements.

2. The method of claim 1, wherein the data reporting API is used to generate code that creates appropriate data structures to store the instance data, assign values to the data structures, and allocate space.

3. The method of claim 1, wherein the data reporting API is used to generate code that creates an event stream representation of the instance data.

4. A computer program product for interfacing with an XML (Extensible Markup Language) parser generator to generate deserialization information interleaved with XML parsing and validation, the computer program product comprising: a non-transitory storage medium readable by a processing circuit and storing instructions for execution by the processing circuit for performing a method comprising:
    providing an XML parser generator with information about a specified input schema which the instance data conforms to;

providing a data reporting application programming interface (API) module;
generating, by the XML parser generator, an XML parser to parse and validate instance documents conforming to the specified input schema;
inserting, by the XML data reporting API module, user-defined code into the XML parser during the generating; and
deserializing the instance documents into the desired deserialization form during the parse using the user-defined code,
wherein two types of information is exchanged between the data reporting API and the XML parser generator,
wherein a first type of information describes a current context that the XML parser generator is currently generating code for, and
wherein a second type of information involves how the instance data is referenced during runtime and how the XML parser generator refers to the referenced instance data for parsing and validation requirements.

5. The computer program product of claim 4, wherein the data reporting API is used to generate code that creates appropriate data structures to store the instance data, assign values to the data structures, and allocate space.

6. The computer program product of claim 4, wherein the data reporting API is used to generate code that creates an event stream representation of the instance data.

7. A system including at least one processor for interfacing with an XML (Extensible Markup Language) parser generator to generate deserialization information interleaved with XML parsing and validation, the at least one processor is configured to perform the steps of:
providing an XML parser generator with information about a specified input schema which the instance data conforms to;
providing a data reporting application programming interface (API) module; performing by a computer;
generating, by the XML parser generator, an XML parser to parse and validate instance documents conforming to the specified input schema;
inserting, by the XML data reporting API module, user-defined code into the XML parser during the generating; and
deserializing the instance documents into the desired deserialization form during the parse using the user-defined code,
wherein two types of information is exchanged between the data reporting API and the XML parser generator,
wherein a first type of information describes a current context that the XML parser generator is currently generating code for, and
wherein a second type of information involves how the instance data is referenced during runtime and how the XML parser generator refers to the referenced instance data for parsing and validation requirements.

\* \* \* \* \*